(12) United States Patent
Cammenga et al.

(10) Patent No.: US 10,668,789 B2
(45) Date of Patent: Jun. 2, 2020

(54) SUNROOF INCORPORATING ELECTRO-OPTIC ELEMENT

(71) Applicant: Gentex Corporation, Zeeland, MI (US)

(72) Inventors: David J. Cammenga, Zeeland, MI (US); David L. Poll, Holland, MI (US); William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/288,020

(22) Filed: Oct. 7, 2016

(65) Prior Publication Data

US 2017/0100991 A1 Apr. 13, 2017

Related U.S. Application Data

(60) Provisional application No. 62/238,414, filed on Oct. 7, 2015.

(51) Int. Cl.
*B60J 1/20* (2006.01)
*B32B 17/10* (2006.01)
(Continued)

(52) U.S. Cl.
CPC ....... *B60J 1/2094* (2013.01); *B32B 17/10036* (2013.01); *B32B 17/1077* (2013.01); *B32B 17/10513* (2013.01); *B32B 17/10761* (2013.01); *B32B 17/10788* (2013.01); *B60J 3/04* (2013.01); *B60J 7/043* (2013.01); *G02F 1/1533* (2013.01); *B32B 2369/00* (2013.01); *G02F 1/15* (2013.01);
(Continued)

(58) Field of Classification Search
CPC ... G02F 1/03; G02F 1/15; G02F 1/155; G02F 1/01; G02F 1/157; G02F 1/163; G02F 2001/1635; G02B 5/282; G02B 5/30; G02B 27/28; B60J 1/2094
USPC ....... 359/245, 248, 254, 265–275, 489, 501, 359/593; 345/105–107
See application file for complete search history.

(56) References Cited

U.S. PATENT DOCUMENTS 3,521,941 A 7/1970 Deb et al.
4,640,583 A 2/1987 Hoshikawa et al.
(Continued)

FOREIGN PATENT DOCUMENTS

GB 2445841 A 7/2008
JP 2012503122 A 2/2012
(Continued)

OTHER PUBLICATIONS

Definition of substrate, https://en.oxforddictionaries.com/definition/substrate, definition obtained Jul. 30, 2018.*
(Continued)

*Primary Examiner* — Kristina M Deherrera
(74) *Attorney, Agent, or Firm* — Price Heneveld LLP; Bradley D. Johnson

(57) ABSTRACT

A vehicle sunroof comprising an electro-optic device is disclosed. The electro-optic device forms a variable transmission window comprising a first layer, a second layer, and an electro-optic medium disposed between the first layer and the second layer. At least one of the first layer and the second layer correspond to a polymeric film. The sunroof further comprises a frame configured to connect the electro-optic device to the vehicle.

7 Claims, 7 Drawing Sheets

(51) Int. Cl.
B60J 3/04 (2006.01)
B60J 7/043 (2006.01)
G02F 1/153 (2006.01)
G02F 1/1516 (2019.01)
G02F 1/15 (2019.01)

(52) U.S. Cl.
CPC .. *G02F 1/15165* (2019.01); *G02F 2001/1536* (2013.01)

(56) References Cited

U.S. PATENT DOCUMENTS

| | | | |
|---|---|---|---|
| 4,646,158 | A | 2/1987 | Ohno et al. |
| 4,671,619 | A * | 6/1987 | Kamimori ............. G02F 1/1525 |
| | | | 359/275 |
| 4,702,566 | A | 10/1987 | Tukude |
| 4,893,908 | A | 1/1990 | Wolf et al. |
| 4,917,477 | A | 4/1990 | Bechtel et al. |
| 5,004,961 | A | 4/1991 | Berner et al. |
| 5,066,111 | A | 11/1991 | Singleton et al. |
| 5,092,939 | A | 3/1992 | Nath et al. |
| 5,124,832 | A | 6/1992 | Greenberg et al. |
| 5,136,419 | A | 8/1992 | Shabrang |
| 5,161,048 | A | 11/1992 | Rukavina |
| 5,228,925 | A | 7/1993 | Nath et al. |
| 5,384,578 | A | 1/1995 | Lynam et al. |
| 5,384,653 | A | 1/1995 | Benson et al. |
| 5,612,847 | A | 3/1997 | Malecke et al. |
| 5,654,736 | A | 8/1997 | Green et al. |
| 5,657,149 | A | 8/1997 | Buffat et al. |
| 5,724,176 | A | 3/1998 | Nishikitani et al. |
| 5,724,187 | A | 3/1998 | Varaprasad et al. |
| 5,725,809 | A | 3/1998 | Varaprasad et al. |
| 5,805,330 | A | 9/1998 | Byker et al. |
| 5,838,483 | A | 11/1998 | Teowee et al. |
| 5,889,608 | A | 3/1999 | Buffat et al. |
| 5,995,273 | A | 11/1999 | Chandrasekhar |
| 6,020,989 | A | 2/2000 | Watanabe |
| 6,045,724 | A | 4/2000 | Varaprasad et al. |
| 6,055,089 | A | 4/2000 | Schulz et al. |
| 6,056,410 | A | 5/2000 | Hoekstra et al. |
| 6,084,702 | A | 7/2000 | Byker et al. |
| 6,193,379 | B1 | 2/2001 | Tonar et al. |
| 6,446,402 | B1 * | 9/2002 | Byker ............... B32B 17/10036 |
| | | | 252/581 |
| 2005/0002081 | A1 | 1/2005 | Beteille et al. |
| 2005/0073851 | A1 | 4/2005 | Itoh |
| 2008/0094684 | A1 | 4/2008 | Varaprasad et al. |
| 2010/0315693 | A1 * | 12/2010 | Lam ..................... G02B 5/23 |
| | | | 359/241 |
| 2011/0170030 | A1 | 7/2011 | Boote |
| 2013/0182308 | A1 * | 7/2013 | Guarr ................... G02F 1/1506 |
| | | | 359/275 |
| 2015/0109651 | A1 | 4/2015 | Branda et al. |
| 2015/0168619 | A1 * | 6/2015 | Ohmoto ............ B32B 17/10651 |
| | | | 359/359 |

FOREIGN PATENT DOCUMENTS

| | | |
|---|---|---|
| JP | 2015526746 A | 9/2015 |
| KR | 100889905 B1 | 3/2009 |
| WO | 2011109688 A1 | 9/2011 |
| WO | 2013106921 A1 | 7/2013 |

OTHER PUBLICATIONS

International Search Report and Written Opinion of the International Searching Authority, or the Declaration, dated Dec. 29, 2016, for International Application No. PCT/US2016/055989, filed Oct. 7, 2016, 6 pages.

* cited by examiner

US 10,668,789 B2

SUNROOF INCORPORATING ELECTRO-OPTIC ELEMENT

CROSS-REFERENCE TO RELATED APPLICATION

This application claims priority to U.S. Provisional Application No. 62/238,414, filed on Oct. 7, 2015, entitled "SUNROOF INCORPORATING ELECTRO-OPTIC ELEMENT," the disclosure of which is hereby incorporated herein by reference in its entirety.

TECHNOLOGICAL FIELD

The present disclosure relates generally to an electro-optic device and more particularly to an electro-optic sunroof for a vehicle.

SUMMARY

According to one aspect of the present disclosure, a vehicle sunroof comprising an electro-optic device is disclosed. The electro-optic device forms a variable transmission window comprising a first layer, a second layer, and an electro-optic medium disposed between the first layer and the second layer. At least one of the first layer and the second layer correspond to a polymeric film. The sunroof further comprises a frame configured to connect the electro-optic device to the vehicle.

According to another aspect of the present disclosure, a vehicle sunroof comprising an electro-optic device is disclosed. The electro-optic device forms a variable transmission window comprising a first layer, a second layer, and an electro-optic medium disposed between the first layer and the second layer. At least one of the first layer and the second layer correspond to a polymeric film. The electro-optic medium is configured to laminate the first layer and the second layer together. The sunroof further comprises a frame configured to connect the electro-optic device to the vehicle.

According to yet another aspect of the present disclosure, a vehicle sunroof comprising an electro-optic device is disclosed. The electro-optic device forms a variable transmission window comprising a first film layer, a second film layer, and an electro-optic medium disposed between the first film layer and the second film layer. The sunroof further comprises a first protective substrate bonded to the first film layer via a first lamination layer. A second protective substrate is bonded to the second film layer via a second lamination layer. A frame is configured to connect the electro-optic device to the vehicle.

These and other features, advantages, and objects of the present device will be further understood and appreciated by those skilled in the art upon studying the following specification, claims, and appended drawings.

DETAILED DESCRIPTION OF EMBODIMENTS

Figure 1:
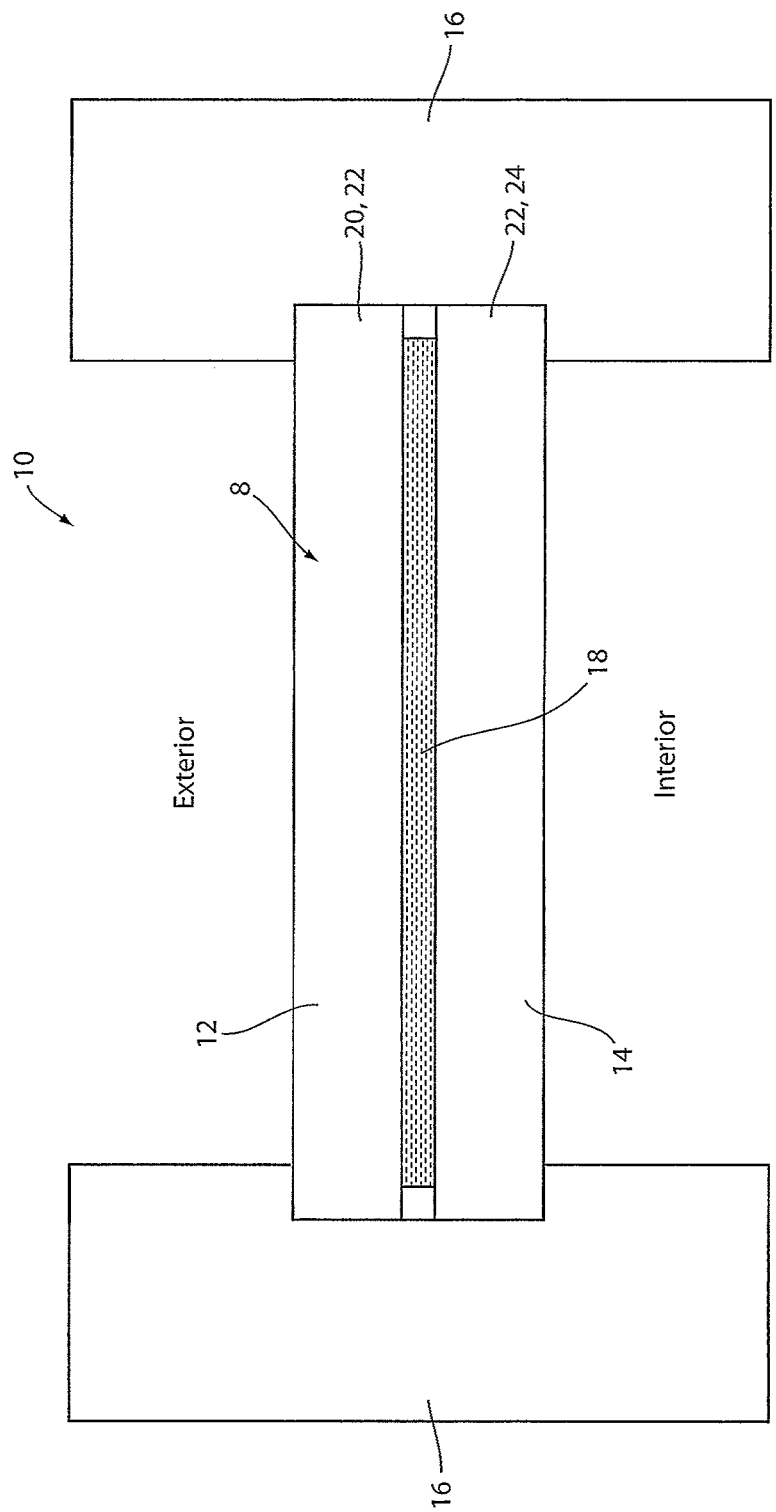
FIG. 1 is a profile view of a sunroof comprising an electro-optic device.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Automotive windows may be tempered glass to improve durability. Windshields, for example, may comprise tempered glass so breakage is less likely to occur. Tempered glass is very strong because both exterior surfaces are under compression. When tempered glass breaks, however, the entire substrate will break into small pieces. This is useful in that it does not create large shards. However, with tempered glass a small defect like a seed or a bubble in the substrate can cause spontaneous breakage.

Referring to FIG. 1, an electro-optic device 8 is shown incorporated as part of a sunroof 10 for a vehicle. The electro-optic device 8 may be constructed from two substrates corresponding to a first substrate 12 and a second substrate 14. The first substrate 12 and the second substrate 14 are secured to an assembly of the sunroof 10 by a frame 16. The first substrate 12 may correspond to an exterior substrate configured to be exposed to an outside environment. The second substrate 14 may correspond to an interior substrate. Each of the substrates may correspond to flexible or rigid materials that may be formed to have various contoured (e.g. convex, concave, curved) surfaces to suit a variety of sunroof configurations. Accordingly, the sunroof 10 may be utilized to provide for a variable-transmittance device for use in the vehicle.

In an exemplary embodiment, an electro-optic medium 18 can be used as a laminate to hold the first substrate 12 and the second substrate 14 together. The electro-optic medium 18 may include a heavily cross-linked material that will adhere to both substrates 12, 14 such that it acts like a lamination to bind the substrates 12 and 14 together. The electro-optic device 8 substrates 12, 14 may be formed of various materials. For example, the substrates 12 and 14 may be of plastic. Plastics for the substrates may include but are not limited to a clear polycarbonate, polyethylene terephthalate (PET), polyamide, acrylic, cyclic olefin, polyethylene (PEN), metallocene polyethylene (mPE), silicone, urethane, and various polymeric materials. The substrates may also be of various forms of glass including, but not limited to soda lime float glass, borosilicate glass, boro-aluminosilicate glass, or various other compositions. When using glass substrates, they can be annealed, heat strengthened, chemically strengthened, partially tempered or fully tempered. The electro-optic device 8 can be held by a partial or full frame 16 that can be used to support and move the sunroof 30 as desired.

In some embodiments, the substrates 12 and 14 of the electro-optic device 8 may correspond to thin film-like substrates. In such embodiments, each substrate may be referred to as a film layer 20. As discussed above, the substrates 12 and 14 or the film layers 20 may be formed of plastic or polymeric materials. For example, the film layers as described herein may correspond to polyethylene terephthalate (PET) film, metallocene polyethylene (mPE) film, a silicone film, a urethane film, or various film-like materials. In this configuration, the film layer 20 may form a first film layer 22 and a second film layer 24 configured to enclose an exterior surface and an interior surface of the electro-optic medium 18 of the electro-optic device 8, respectively. Accordingly, the electro-optic device 8 may form a thin, flexible assembly that may conform to various shapes and contours of the sunroof 10.

The cross-linked material of the electro-optic medium 18 may correspond to various heavily cross-linked materials that may adhere to one or more of the substrates 12, 14. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure may correspond to exemplary materials that may be employed as heavily cross-linked materials to adhere to one or more of the substrates 12, 14. Accordingly, the specific examples described herein are to be considered non-limiting examples.

In some embodiments, the electro-optic device 8 may be configured to conform to one or more standards. An example of such a standard may include a ball drop test of the Federal Motor Vehicle Safety Standards (FMVSS). In this test, the sunroof 10 may be required to withstand the impact of an approximately 225 gram (8 ounce) steel ball dropped from 9 meters under normal gravitational force on earth (ie. approximately 9.8 m/s$^2$). In order to successfully pass the ball drop test, the sunroof 10 must prevent the steel ball from penetrating through the sunroof 10. Additionally, if broken the sunroof must retain a high percentage of the broken glass. Experimental results have demonstrated that the various embodiments of the disclosed sunroof are operable to prevent the penetration of the steel ball and retain broken glass as required by the standard.

The electro-optic device 8 as discussed herein may be configured to vary a transmission of light at least through the substrates 12 and 14 in the various embodiments of sunroofs discussed herein. The electro-optic device 8 may correspond to an electrochromic device be configured to vary the transmissivity of the sunroof assemblies discussed herein in response to an applied voltage from one or more control circuits. Examples of control circuits and related devices that may be configured to provide for electrodes and hardware configured to control the electro-optic device 8 are generally described in commonly assigned U.S. Pat. No. 8,547,624 entitled "VARIABLE TRANSMISSION WINDOW SYSTEM", U.S. Pat. No. 6,407,847 entitled "ELECTROCHROMIC MEDIUM HAVING A COLOR STABILITY", U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Patent Application Publication No. 2006/0056003 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which are incorporated herein by reference in its entirety.

Figure 2:
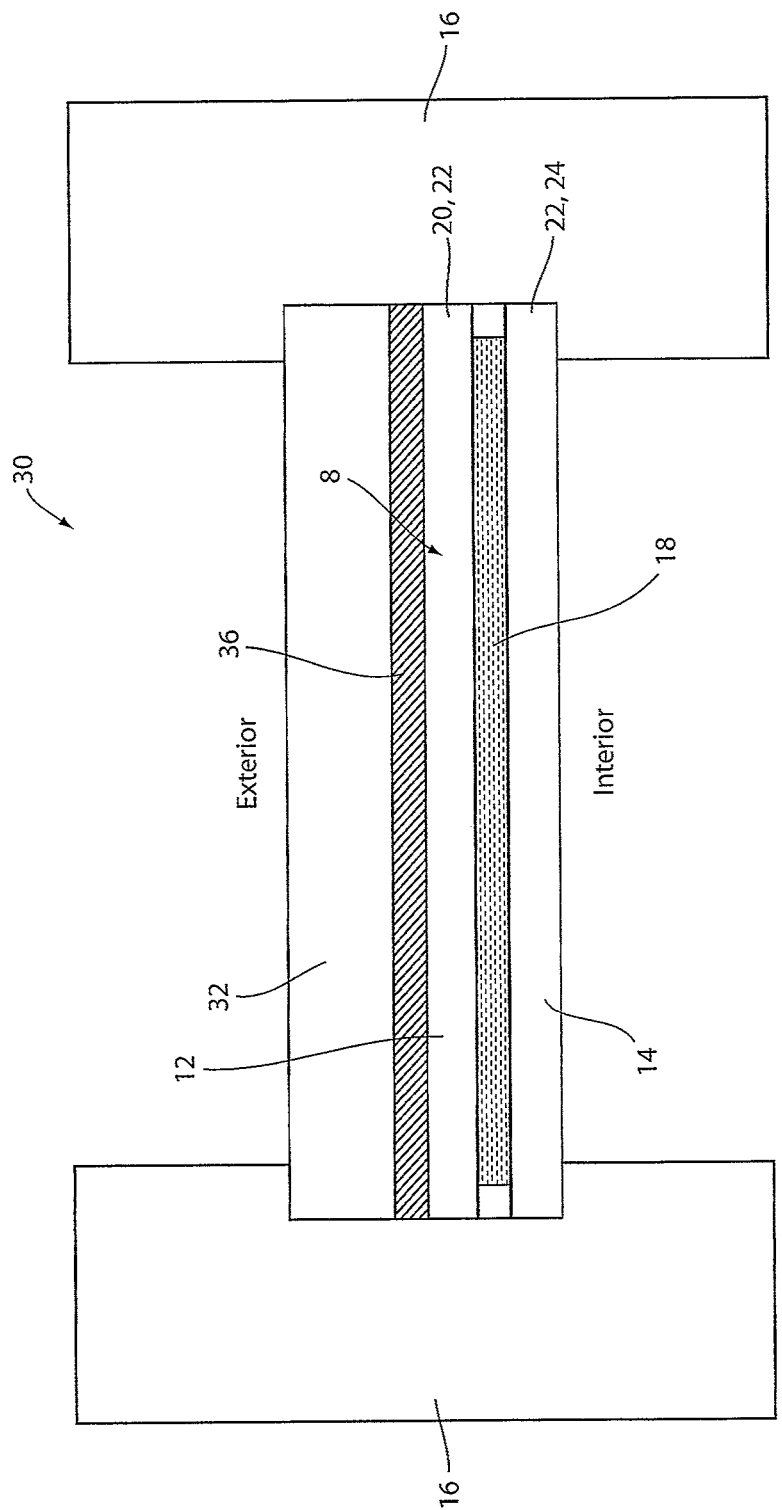
FIG. 2 is a profile view of a sunroof having an external protective substrate configured to prevent breakage.

Referring now to FIG. 2, an embodiment of a sunroof 30 comprising an external protective substrate 32 is shown. For clarity, like reference numerals may be used to describe like elements in reference to each of the embodiments discussed herein. In FIG. 2, the electro-optic device 8 is laminated to an external protective substrate 32 using a lamination layer 36 formed from a lamination material. The external protective substrate 32 may be formed of various materials. For example, external protective substrate 32 may be of plastic such as a clear polycarbonate, soda lime float glass, borosilicate glass, boro-aluminosilicate glass, Gorilla® Glass or various other compositions. The external protective substrate 32 can be annealed, heat strengthened, chemically strengthened, partially tempered or fully tempered. As discussed in reference to the substrates 12 and 14, the protective substrates (e.g. the exterior protective substrate 32 and the interior protective substrate 42) may also be formed to have various contoured (e.g. convex, concave, curved) surfaces to suit a variety of sunroof configurations.

The external protective substrate 32 may be configured to protect the electro-optic device 8 from external debris such as a stone that may impact the sunroof 30. If the external protective substrate 32 breaks, the lamination layer 36 may prevent debris from breaking away from the substrates 12 and 32. Additionally, the electro-optic medium 18 of the electro-optic device 8 may include a heavily cross-linked material configured to adhere to the substrates 12, 14. In this configuration, the electro-optic device 8 may act in combination with the external protective substrate 32 to prevent portions of the substrates 12, 14, and 32 from breaking away from the sunroof 30.

As discussed in reference to FIG. 1, the substrates 12 and 14 may also correspond to film layers 20 formed of plastic or polymeric materials. In such embodiments, the first film layer 22 and a second film layer 24 may be trimmed and formed to the external protective substrate 32 to form a contoured shape for the sunroof 30. In such embodiments, the electro-optic device 8 may form a thin, flexible assembly that may be formed or bonded to various shapes and contours of the protective substrates as discussed herein. Based on experimental data, the sunroof assemblies as discussed herein may successfully pass the 9 m ball drop test while having very thin overall thicknesses. Accordingly, the inclusion of at least one film layer 20 or may provide for beneficial configuration for thin sunroofs as discussed herein.

The lamination material of the lamination layer 36 may be configured to hold and retain pieces of the external protective substrate 32. If, however, the first substrate 12 breaks, and the electro-optic medium 18 is not sufficient to hold the fragments formed, pieces of the first substrate 12 could potentially be released in the interior of the vehicle. To increase strength of the overall construction, the external protective substrate 32 may correspond to a plurality of substrates that may be laminated as discussed herein. The thickness of the external protective substrate 32 may be less than 1.4 mm to minimize weight and overall thickness. However, a wide range of thicknesses and weights may be utilized to suit a particular application.

The lamination material of the lamination layer 36 may correspond to various materials, alone or in combination. For example, the lamination material may correspond to one or more of polyvinyl butyral (PVB), ethylene-vinyl acetate (EVA), thermoset EVA, thermoplastic polyurethane (TPU), and various other materials. Accordingly, the lamination material may vary for a particular application. In an exemplary embodiment, the lamination layer 36 may be less than 0.7 mm, and in some embodiments, the lamination layer 36 may be less than 0.5 mm thick. Minimizing the thickness of the lamination material of the lamination layer 36 may assist in minimizing the overall thickness of the sunroof as described in various embodiments herein.

Figure 3:
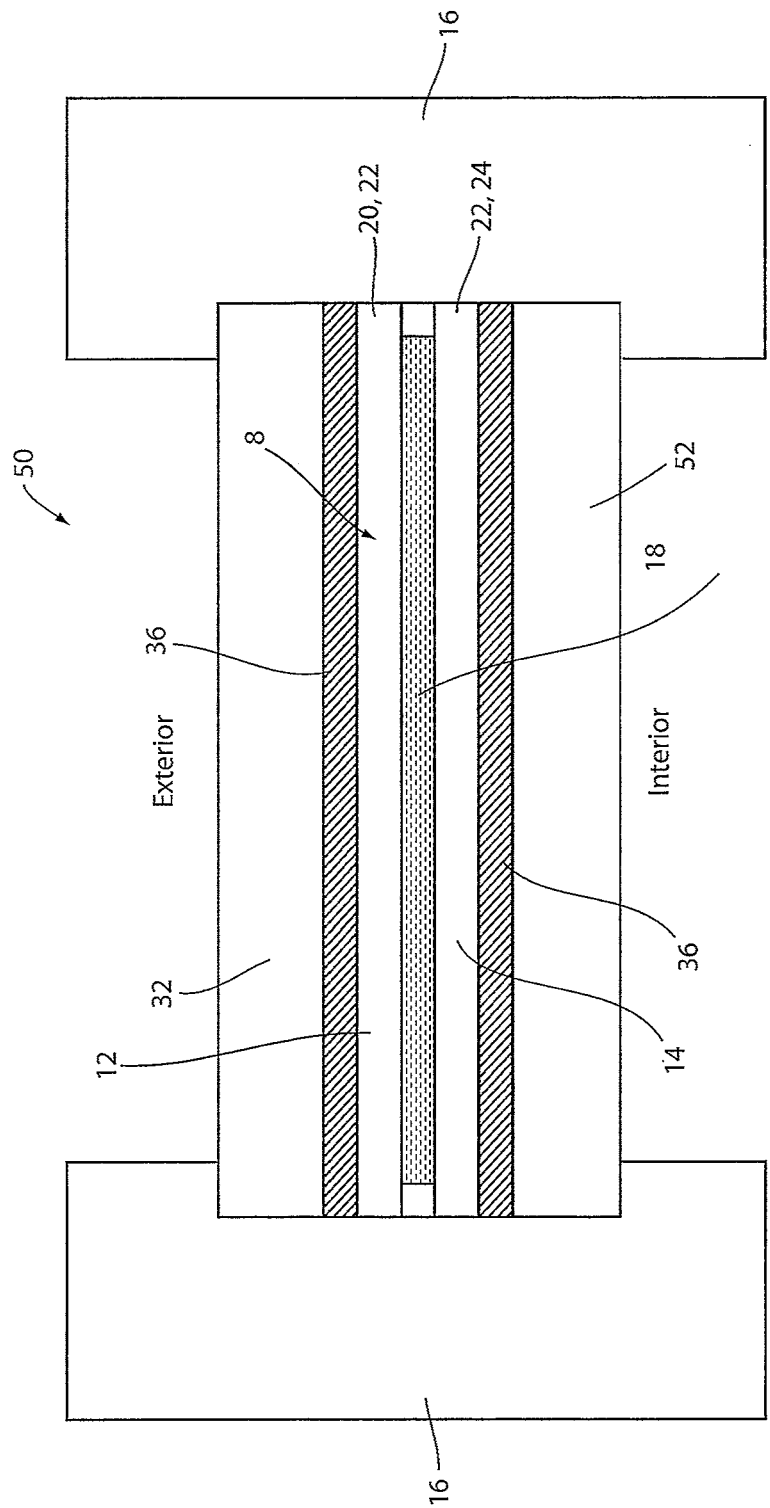
FIG. 3 is a profile view of a sunroof having an external protective substrate and an internal protective substrate configured to prevent breakage.

Referring now to FIG. 3, an embodiment of a sunroof 50 comprising an external protective substrate 32 and an internal protective substrate 52 is shown. In some embodiments, the internal protective substrate 52 may be laminated to the interior surface of the first substrate 12 of the electro-optic device 8. In the embodiment of the sunroof 50 demonstrated in FIG. 3, the electro-optic device 8 is laminated to the internal protective substrate 52 using the lamination layer 36. Similar to the external protective substrate 32, the internal protective substrate 52 may be formed of various materials. For example, the internal protective substrate 52 may be of plastic such as a clear polycarbonate, soda lime float glass, borosilicate glass, boro-aluminosilicate glass, or various other compositions. The internal protective substrate 52 can be annealed, heat strengthened, chemically strengthened, partially tempered or fully tempered. As such, the internal protective substrate 52 may be configured to prevent loose or cracked portions of each of the substrates 12, 14, and 42 from entering the interior of the vehicle.

For example, if the second substrate 14 breaks and the electro-optic medium 18 is not sufficient to hold the fragments formed, pieces of the second substrate 14 could be lost to the exterior of the vehicle and cause damage to the vehicle. To increase strength of the overall construction of the sunroof 50, the internal protective substrate 52 may be laminated to the interior surface of the second substrate. Additionally, the internal protective substrate may include more than one substrate. The thickness of the internal protective substrate 52 may be less than 1.4 mm to minimize weight and overall thickness. However, a wide range of thicknesses and weights may be utilized to suit a particular application.

As previously discussed, the substrates 12 and 14 may correspond to film layers 20 may be formed of plastic or polymeric materials. In such embodiments, the first film layer 22 may be trimmed and formed to the external protective substrate 32 and the second film layer 24 may be trimmed and formed to the internal protective substrate 42.

In such embodiments, the electro-optic device 8 may form a thin, flexible assembly that may be adhered, formed, or bonded to various shapes and contours of the protective substrates 32, 42 as discussed herein. Based on experimental data, the sunroof assemblies as discussed herein may successfully pass the 9 m ball drop test while having very thin overall thicknesses. Accordingly, the inclusion of at least one film layer 20 or film layers 22, 24 may provide for beneficial configuration for thin sunroofs as discussed herein.

As discussed herein, the sunroof 50 may comprise four substrates. For example, the four substrates may correspond to the first substrate 12, the second substrate 14, the external protective substrate 42, and the internal protective substrate 52. In such configurations, the four substrates, the electro-optic medium 18, and the lamination layers 36 may each have a thickness that adds to define the overall thickness of the sunroof 50. In some exemplary embodiments, the overall thickness of the four-substrate sunroof may be less than 5 mm. In an experimental embodiment, the overall thickness of the four-substrate sunroof (e.g. the sunroof 50) was measured to be less than 4.5 mm and the four-substrate sunroof was operable to withstand the impact of the steel ball in the ball drop test as discussed herein.

Figure 4:
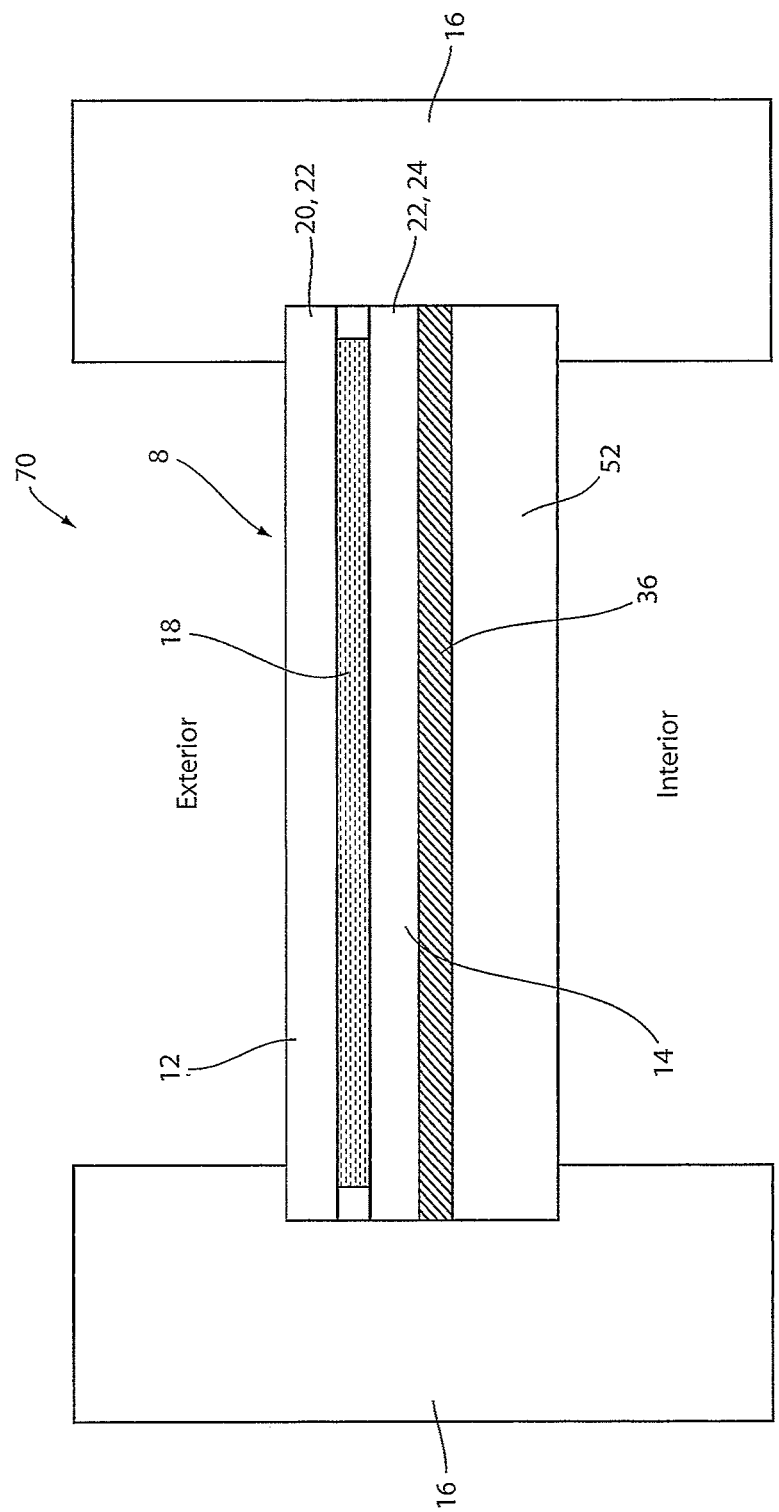
FIG. 4 is a profile view of a sunroof having an internal protective substrate configured to prevent breakage.

Referring now to FIG. 4, in some embodiments, an embodiment of a sunroof 70 may be produced comprising an internal protective substrate 52 without the external protective substrate 42. In such embodiments, the internal protective substrate 52 may be laminated to the interior surface of the first substrate 12 of the electro-optic device 8. To increase strength of the overall construction, the internal protective substrate 52 may correspond to a plurality of substrates that may be laminated as discussed herein. The internal protective substrate 52 may be configured to prevent loose or cracked portions of each of the substrates 12, 14, and 52 from entering the interior of the vehicle.

Referring now to FIGS. 2 and 4, the sunroof (e.g. 30 and 70) may comprise three substrates. For example, the three substrates may correspond to the first substrate 12, the second substrate 14, and one of the external protective substrate 42 and the internal protective substrate 52. The three substrates may also correspond to the first film layer 22, the second film layer 24, and at least one of the protective layers 32, 42. In such configurations, the three substrates, the electro-optic medium 18, and the lamination layer 36 may each have a thickness that adds to define the overall thickness of the three-substrate sunroof. In some exemplary embodiments, the overall thickness of the three-substrate sunroof may be less than 3.5 mm. In an experimental embodiment, the overall thickness of the three-substrate sunroof was measured to be less than 3 mm and the three-substrate sunroof was operable to withstand the impact of the steel ball in the ball drop test as discussed herein.

Referring to FIG. 3, the sunroof 40 may comprise four substrates. For example, the four substrates may correspond to the first film layer 22, the second film layer 24, the external protective substrate 42, and the internal protective substrate 52. In such configurations, the four substrates, the electro-optic medium 18, and the lamination layers 36 may each have a thickness that adds to define the overall thickness of the four-substrate sunroof. In some exemplary embodiments, the overall thickness of the four-substrate sunroof may be less than 4 mm. In an experimental embodiment, the overall thickness of the four-substrate sunroof was measured to be less than 3.5 mm and the three-substrate sunroof was operable to withstand the impact of the steel ball in the ball drop test as discussed herein without allowing the steel ball to penetrate the sunroof.

As demonstrated in FIG. 3, the four-substrate structure may also be applied in various configurations. For example, the four-substrate structure may be formed of the materials and elements listed in Table 1.

TABLE 1

Exemplary embodiment of four-substrate structure with 2 film layers

| Sunroof Element | Material |
| --- | --- |
| exterior protective layer 32 | 0.7 mm Eagle Glass (ITO Out) |
| first film layer 22 | 630 um TPU/120 um PET |
| electro-optic medium 18 | electrochromic gel |
| second film layer 24 | 120 um PET/630 um TPU |
| interior protective layer 42 | 0.7 mm Eagle Glass (ITO Out) |

Such a configuration of the film layers 20 in combination may similarly be applied to any of the embodiments discussed herein (e.g FIGS. 1 and 2).

Figure 5:
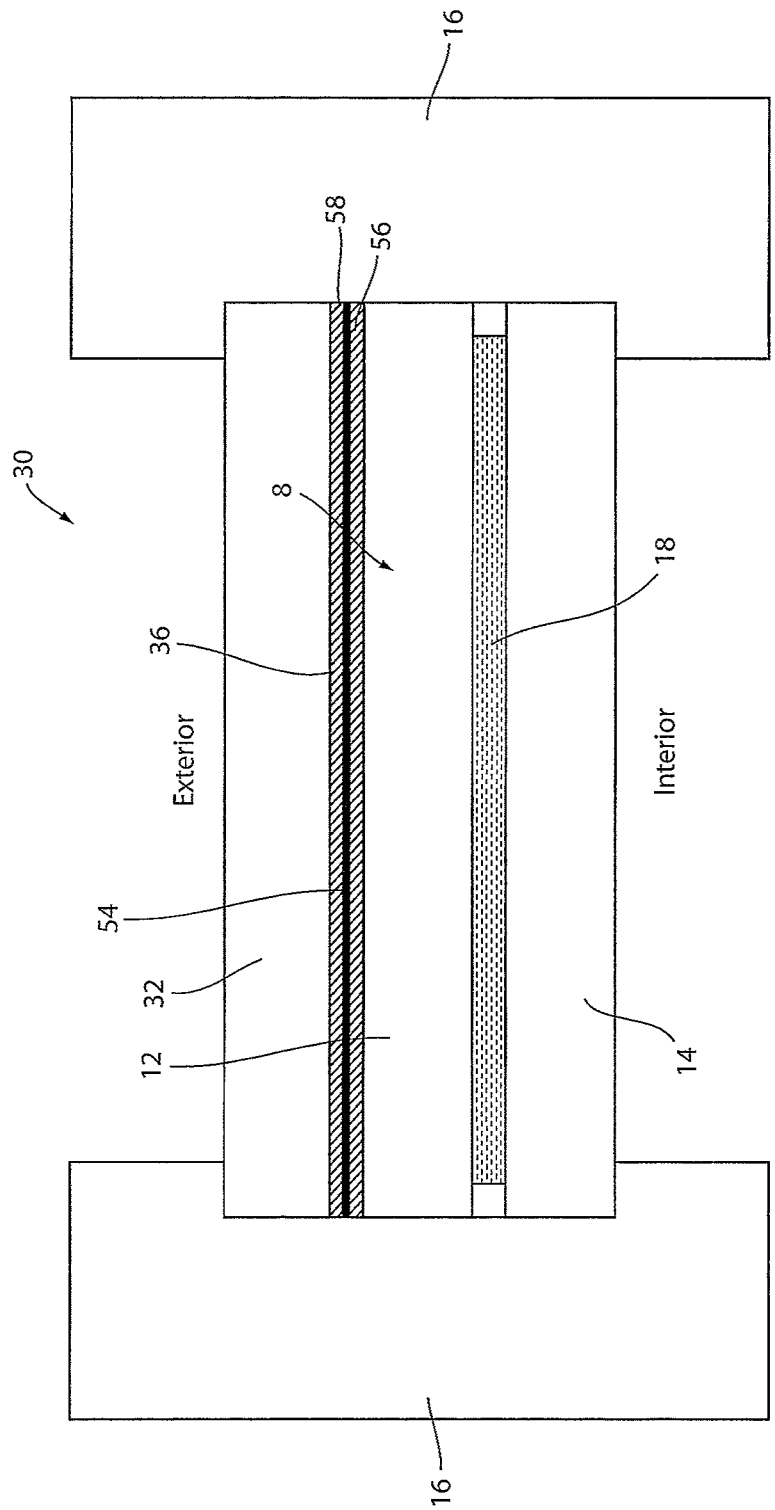
FIG. 5 is a profile view of a sunroof having an external protective substrate configured to prevent breakage.
Figure 6:
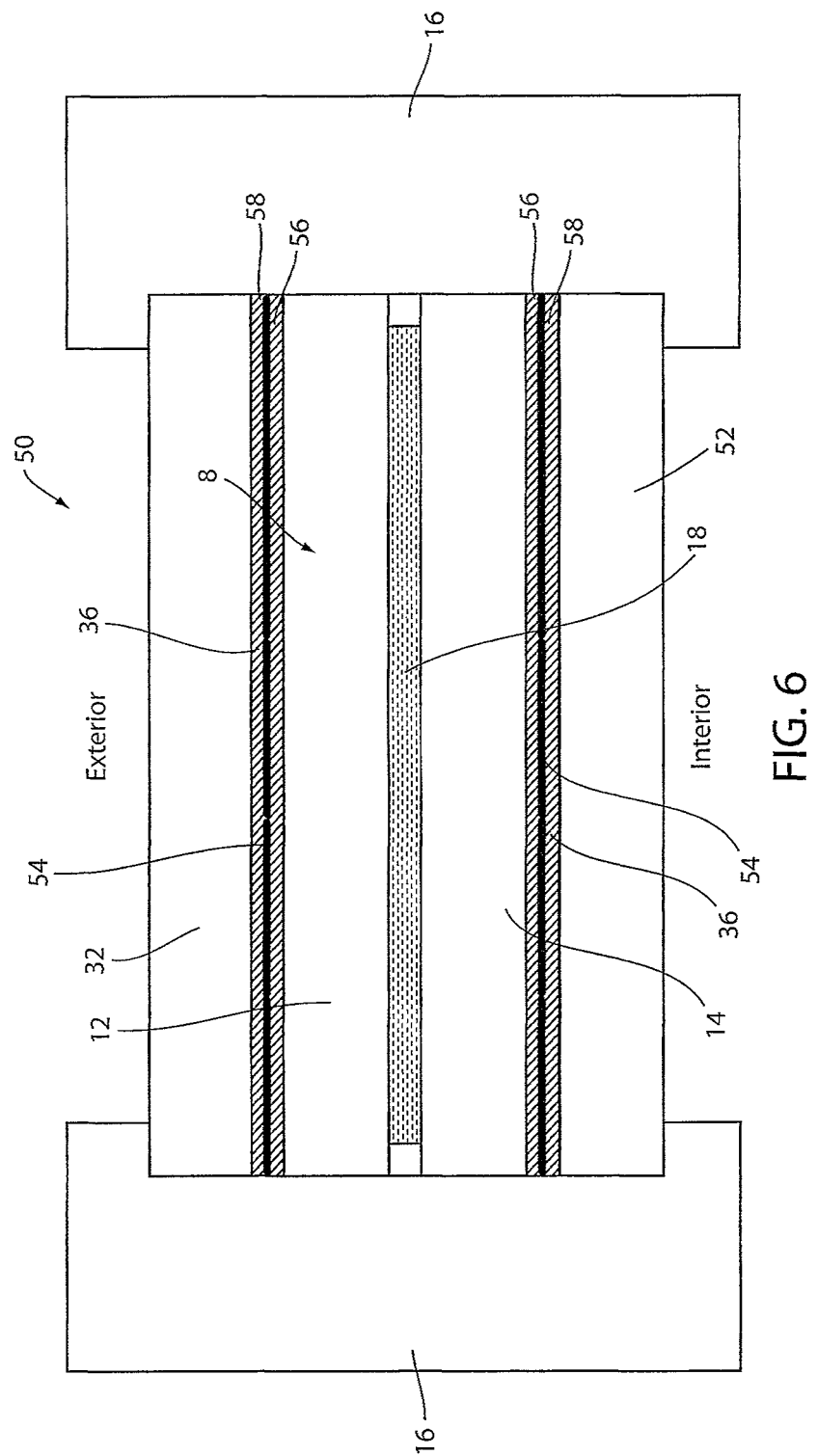
FIG. 6 is a profile view of a sunroof having an external protective substrate and an internal protective substrate configured to prevent breakage.
Figure 7:
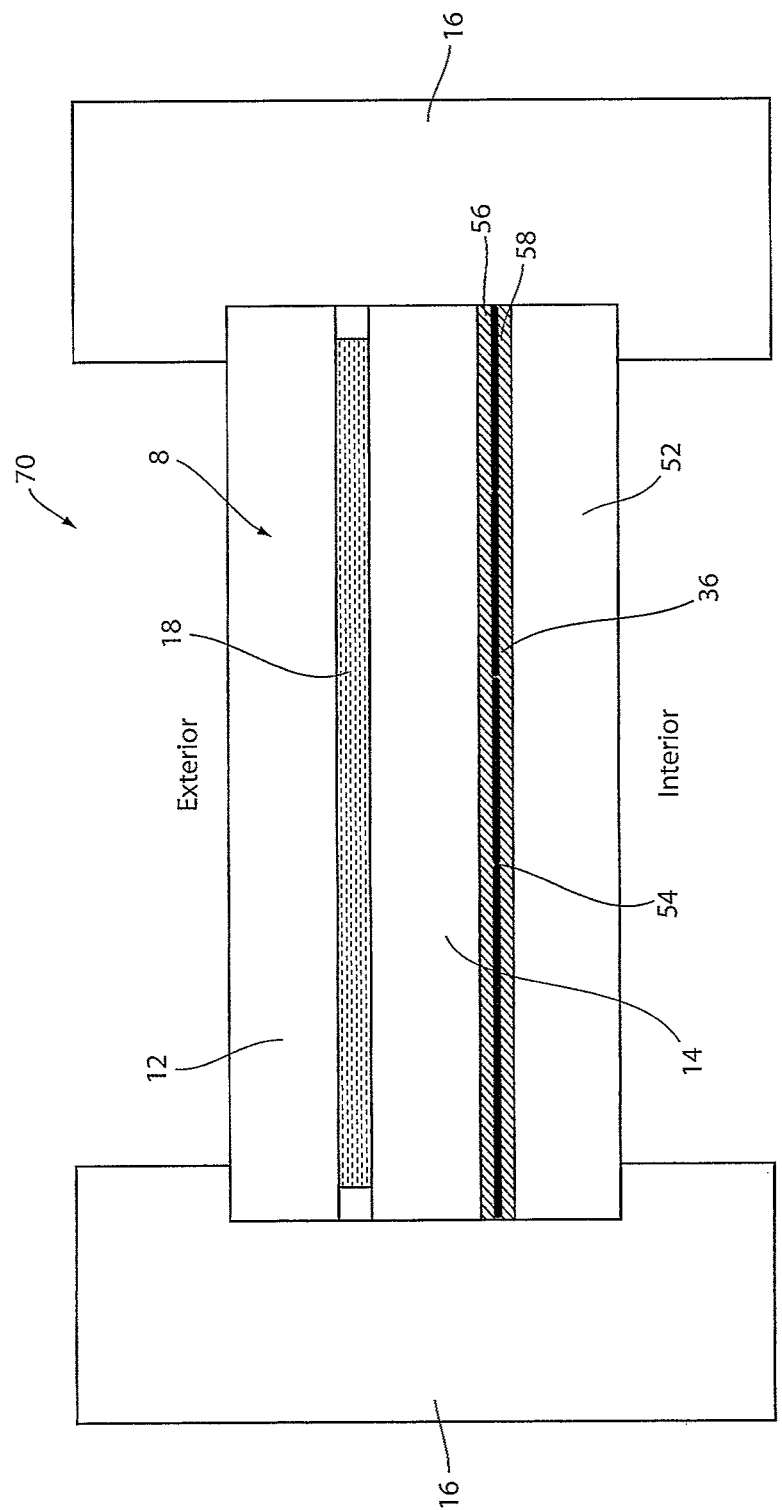
FIG. 7 is a profile view of a sunroof having an internal protective substrate configured to prevent breakage in accordance with the disclosure.

Referring now to FIGS. 5-7, the various embodiments demonstrate that the lamination layer 36 may be disposed between at least one of the substrates 12, 14 and one or more of the protective substrates 42, 52. In some embodiments, the lamination layer 36 may further comprise an interlayer film 54 disposed within the lamination material. The interlayer film 54 may correspond to a thin film material similar to the film layer 20 and may be configured to bind the lamination layer 36 to the substrates 12, 14 and one or more of the protective substrates 42, 52. In this configuration, the interlayer film 54 may retain shattered pieces of the substrates 12, 14 or the protective substrates 42, 52 in the event of breakage.

The interlayer film 54 may correspond to various materials. For example, the interlayer film 54 may correspond to a polyethylene terephthalate (PET) film, metallocene polyethylene (mPE) film, a silicone film, a urethane film, or various film-like materials. In some embodiments, a plurality of lamination film layers may also be utilized to further reinforce the sunroof. Embodiments of the sunroof comprising the interlayer film 54 may provide for additional strength for some applications. Accordingly, the various embodiments of the sunroof described herein may be comprise one or more of the protective substrates 42, 52 and the interlayer film 54 depending on the desired application.

In some embodiments, it may be desirable to have the first substrate 12 and the second substrate 14 each correspond to a glass substrate less than 1.7 mm in thickness. Glass of such a thickness may not be easily tempered and may be prone to breaking than thicker glass. Accordingly, while strengthening glass thermally or chemically may improve durability, in some embodiments (e.g. thin glass of less than 1.7 mm), thin glass may not be amenable to such strengthening. In such embodiments, the interlayer film 54 may be particularly beneficial to improve the durability of the sunroof.

In an exemplary embodiment, an electro-optic device (e.g. an electrochromic device) may be formed of the first substrate 12 and the second substrate 14 each corresponding to glass substrates having a thickness of 0.7 mm thick glass. The electro-optic medium 18 may be disposed between the first substrate 12 and the second substrate 14. Additionally, at least one of the first substrate 12 and the second substrate 14 may be laminated to the exterior protective layer 42 or the interior protective layer 52, which may also correspond to a glass layer having a thickness of 0.7 mm.

The protective layers 42 or 52 may be laminated to the one of the first substrate 12 and the second substrate via the lamination layer 36. The lamination layer 36 may comprise a first layer 56 of lamination material (e.g. EVA) laminated to the interlayer film 54 (e.g. mPE) and the first substrate 12 or the second substrate 14. The lamination layer 36 may further comprise a second layer 58 of lamination material (e.g. EVA) laminated to the interlayer film 54 (e.g. mPE) and the protective substrate 42 or 52. In this configuration, a three-substrate structure may be formed, which has been demonstrated to pass the 9 m ball drop test. Though discussed in reference to the three-substrate structure demonstrated in FIGS. 5 and 7, the interlayer film 54 may be similarly applied in the four-substrate structure demonstrated in FIG. 6.

The three-substrate structure of 0.7 mm glass substrates may be configured to have a thin overall thickness. For example, each of the three glass substrates 12, 14, and one of 42 and 52; the electro-optic medium 18; and the lamination layer 36 may have a combined thickness that adds to define the overall thickness of the three-substrate sunroof. The overall thickness of the three-substrate sunroof may be less than 5 mm. In an experimental embodiment, the overall thickness of the three-substrate sunroof was measured to be less than 4.5 mm and the sunroof was operable to withstand the impact of the steel ball in the 9 m ball drop test as discussed herein.

As demonstrated in FIG. 7, the three-substrate structure may comprise a plurality of interlayer films 54 disposed between the second substrate 14 and the interior protective layer 42. For example, the three-substrate structure may be formed of the materials and elements listed in Table 2.

TABLE 2

Exemplary embodiment of three-substrate structure

| Sunroof Element | Material |
| --- | --- |
| first substrate 12 | 0.7 mm Eagle Glass (ITO in) |
| electro-optic medium 18 | electrochromic gel |
| second substrate 14 | 0.7 mm Eagle Glass (ITO in) |
| interlayer film 54 | 380 um EVA/560 um MPE/380 um EVA |
| interior protective layer 42 | 0.7 mm Eagle Glass (ITO Out) |

Such a configuration of the interlayer films 54 in combination may similarly be applied to any of the embodiments discussed herein (e.g FIGS. 5 and 6).

As demonstrated in FIG. 6, the four-substrate structure may also be applied in various configurations. For example, the four-substrate structure may be formed of the materials and elements listed in Table 3.

TABLE 3

Exemplary embodiment of four-substrate structure

| Sunroof Element | Material |
| --- | --- |
| exterior protective layer 32 | 0.7 mm Eagle Glass (ITO Out) |
| interlayer film 54 | 760 um EVA |
| first substrate 12 | 0.7 mm Eagle Glass (ITO in) |
| electro-optic medium 18 | electrochromic gel |
| second substrate 14 | 0.7 mm Eagle Glass (ITO in) |
| interlayer film 54 | 760 um EVA |
| interior protective layer 42 | 0.7 mm Eagle Glass (ITO Out) |

In some embodiments, the lamination layer 36 may not be used instead relying on the protective construction of the external protective substrate and the internal protective substrate. In this case, the lamination material 36 may be replaced with an air gap between the electro-optic device 8 and one or more of the substrates 12 and 14 and/or the protective substrates.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle sunroof comprising:
   an electro-optic device forming a variable transmission window comprising:
      a first substrate;
      a second substrate; and
      an electro-optic medium disposed between the first substrate and the second substrate;
   a third substrate in connection with the first substrate and formed on an exterior surface of the sunroof;
   a first polymer film disposed between the first substrate and the third substrate and laminated to each of the first substrate and the third substrate, wherein the polymer film forms an interlayer film bonded to the first substrate and the third substrate with a lamination material, wherein the polymeric film comprises a polyethylene terephthalate (PET) film laminated to each of the first substrate and the third substrate and the lamination material is of ethylene-vinyl acetate (EVA);
   a fourth substrate in connection with the second substrate;
   a second polymer film disposed between the second substrate and the fourth substrate and laminated to each of the second substrate and the fourth substrate, wherein the polymer film forms an interlayer film bonded to the first substrate and the third substrate with the lamination material, wherein the polymeric film comprises a polyethylene terephthalate (PET) film laminated to each of the second substrate and the fourth substrate; and
   a frame configured to connect the electro-optic device to the vehicle, wherein each of the first substrate, the second substrate, the third substrate, and the fourth substrate are formed of a rigid, impact resistant glass.

2. The sunroof according to claim 1, wherein the third substrate forms an exterior protective layer of the sunroof.

3. The sunroof according to claim 1, wherein the first substrate and the second substrate each have a thickness of less than or equal to 1.4 mm.

4. The sunroof according to claim 1, wherein the polymeric film is formed of a flexible material configured to conform to a contour of the first substrate.

5. A vehicle sunroof comprising:
   an electro-optic device forming a variable transmission window comprising:
      a first glass layer;
      a second glass layer; and
      an electrochromic medium disposed between the first glass layer and the second glass layer;
   a first protective glass substrate bonded to the first glass layer;
   a polymer film disposed between the first glass layer and the first protective glass substrate, wherein the polymer film is laminated to the first glass layer by a first lamination layer and the first protective substrate by a second lamination layer;
   a second protective glass substrate bonded to the second glass layer via a third lamination layer; and
   a frame configured to connect the electro-optic device to the vehicle.

6. The sunroof according to claim 5, wherein the electro-optic device, the first protective glass substrate, the second protective glass substrate, and the lamination layers combine to form a thickness of the sunroof, and wherein the thickness is less than 4 mm.

7. The vehicle sunroof according to claim 5, wherein each of the first glass layer, the second glass layer, the first protective glass substrate, and the second protective glass substrate each have a minimum thickness greater than or equal to 0.7 mm.

\* \* \* \* \*